(12) United States Patent
Geinik et al.

(10) Patent No.: US 12,017,198 B2
(45) Date of Patent: Jun. 25, 2024

(54) POTASH DUST GRANULATION PROCESS

(71) Applicant: DEAD SEA WORKS LTD., Beer Sheva (IL)

(72) Inventors: Natalia Geinik, Arad (IL); Khalil Abu Rabeah, Beer sheva (IL); Ruben Socolovsky, Beer sheva (IL); Yacov Levy, Dimona (IL); Marina Dakov, Arad (IL)

( * ) Notice: Subject to any disclaimer, the term of this patent is extended or adjusted under 35 U.S.C. 154(b) by 948 days.

(21) Appl. No.: 16/969,994

(22) PCT Filed: Nov. 30, 2018

(86) PCT No.: PCT/IL2018/051315
§ 371 (c)(1),
(2) Date: Aug. 14, 2020

(87) PCT Pub. No.: WO2019/167036
PCT Pub. Date: Sep. 6, 2019

(65) Prior Publication Data
US 2021/0101844 A1    Apr. 8, 2021

Related U.S. Application Data

(60) Provisional application No. 62/635,604, filed on Feb. 27, 2018.

(51) Int. Cl.
*B01J 2/00*    (2006.01)
*B01J 2/28*    (2006.01)
*C05D 1/00*    (2006.01)
*C05G 5/12*    (2020.01)

(52) U.S. Cl.
CPC . *B01J 2/00* (2013.01); *B01J 2/28* (2013.01); *C05D 1/005* (2013.01); *C05G 5/12* (2020.02)

(58) Field of Classification Search
None
See application file for complete search history.

(56) References Cited

U.S. PATENT DOCUMENTS

| | | |
|---|---|---|
| 2,136,996 A | 11/1938 | Wiedbrauck |
| 2,138,827 A | 12/1938 | Bailey |
| 2,997,171 A | 8/1961 | Samsel |
| 3,043,652 A | 7/1962 | Schytil |

(Continued)

FOREIGN PATENT DOCUMENTS

| | | |
|---|---|---|
| BR | 102012031210 | 1/2015 |
| CN | 1032116 A | 4/1989 |

(Continued)

OTHER PUBLICATIONS

"Compendium of Polysulphate scientific research", Potash House, P.O. Box 75, Beer-Sheva 8410001, Israel, www.polysulphate.com (Dec. 31, 2016) 88 pages.

(Continued)

*Primary Examiner* — Wayne A Langel
(74) *Attorney, Agent, or Firm* — AlphaPatent Associates Ltd.; Daniel J. Swirsky

(57) ABSTRACT

According to some embodiments there is provided herein a granule of potash dust comprising a binder selected from the group including Flyash, Sodium Silicate, Potassium Silicate and starches, wherein said potash dust comprises particles in the size between 0.001-0.5 mm

6 Claims, 1 Drawing Sheet

(56) References Cited

U.S. PATENT DOCUMENTS

| | | | |
|---|---|---|---|
| 3,332,470 A | 7/1967 | Chirico | |
| 3,332,827 A | 7/1967 | Griffith | |
| 3,532,621 A | 10/1970 | Hough | |
| 3,548,046 A | 12/1970 | Savage | |
| 3,711,254 A | 1/1973 | Mcgowan | |
| 3,876,387 A | 4/1975 | Coulson | |
| 3,877,920 A | 4/1975 | Carlberg | |
| 4,068,718 A | 1/1978 | Cooke, Jr. | |
| 4,129,642 A | 12/1978 | Neitzel | |
| 4,283,423 A | 8/1981 | Watkins | |
| 4,385,920 A * | 5/1983 | Dancy | C01D 7/38 71/36 |
| 4,427,068 A | 1/1984 | Fitzgibbon | |
| 4,963,231 A | 10/1990 | Ryham | |
| 5,112,379 A | 5/1992 | Young | |
| 5,174,804 A | 12/1992 | Rehberg | |
| 5,383,952 A * | 1/1995 | Singewald | C01D 5/004 71/64.11 |
| 5,651,888 A | 7/1997 | Shimizu | |
| 6,284,278 B1 | 9/2001 | Waldman | |
| 6,287,496 B1 | 9/2001 | Lownds | |
| 6,454,979 B1 | 9/2002 | Phinney | |
| 9,266,784 B2 * | 2/2016 | Ferguson | C05D 9/02 |
| 9,592,514 B2 | 3/2017 | Kaps | |
| 2002/0109736 A1 | 8/2002 | Chailleux | |
| 2002/0121117 A1 | 9/2002 | Hartmann | |
| 2004/0139992 A1 | 7/2004 | Murkute | |
| 2005/0072724 A1 | 4/2005 | Nakayama | |
| 2005/0276905 A1 | 12/2005 | Xing | |
| 2006/0003893 A1 | 1/2006 | Pursell | |
| 2006/0144789 A1 | 7/2006 | Cath | |
| 2006/0148646 A1 | 7/2006 | Pursell | |
| 2008/0223098 A1 | 9/2008 | Taulbee | |
| 2009/0261040 A1 | 10/2009 | Pruet | |
| 2009/0272692 A1 | 11/2009 | Kurth | |
| 2010/0213129 A1 | 8/2010 | Jones | |
| 2010/0224476 A1 | 9/2010 | Cath | |
| 2011/0017666 A1 | 1/2011 | Cath | |
| 2011/0064853 A1 | 3/2011 | Maeki | |
| 2011/0123420 A1 | 5/2011 | Phinney | |
| 2011/0218102 A1 | 9/2011 | Anderson | |
| 2011/0257788 A1 | 10/2011 | Wiemers | |
| 2011/0315632 A1 | 12/2011 | Freije, III | |
| 2013/0001162 A1 | 1/2013 | Yangali-Quintanilla | |
| 2013/0233797 A1 | 9/2013 | Cath | |
| 2013/0264260 A1 | 10/2013 | Heinzl | |
| 2014/0001122 A1 | 1/2014 | Schultz | |
| 2014/0175011 A1 | 6/2014 | Benton | |
| 2014/0223979 A1 | 8/2014 | Wiseman | |
| 2014/0245803 A1 | 9/2014 | Forsythe | |
| 2014/0260467 A1 | 9/2014 | Peacock | |
| 2015/0014232 A1 | 1/2015 | Mcginnis | |
| 2015/0101987 A1 | 4/2015 | Yeh | |
| 2016/0060182 A1 | 3/2016 | Cook | |
| 2017/0121233 A1 | 5/2017 | Meakin | |
| 2017/0129822 A1 | 5/2017 | Farnworth | |
| 2017/0129823 A1 | 5/2017 | Kaps | |
| 2017/0305805 A1 | 10/2017 | Farnworth | |
| 2018/0086675 A1* | 3/2018 | Burchard | C05G 3/40 |
| 2018/0179117 A1 | 6/2018 | Socolovsky | |
| 2018/0297903 A1 | 10/2018 | Ledoux | |

FOREIGN PATENT DOCUMENTS

| | | | |
|---|---|---|---|
| CN | 1076435 A | 9/1993 | |
| CN | 1083800 | 3/1994 | |
| CN | 1091990 A | 9/1994 | |
| CN | 1093695 A | 10/1994 | |
| CN | 1236765 A | 12/1999 | |
| CN | 1297371 A | 5/2001 | |
| CN | 1314308 A | 9/2001 | |
| CN | 1387497 | 12/2002 | |
| CN | 1407957 A | 4/2003 | |
| CN | 1485124 | 3/2004 | |
| CN | 1548371 A | 11/2004 | |
| CN | 1690023 A | 11/2005 | |
| CN | 1715258 A | 1/2006 | |
| CN | 1793064 A | 6/2006 | |
| CN | 1997721 A | 7/2007 | |
| CN | 101608168 | 12/2009 | |
| CN | 101772377 A | 7/2010 | |
| CN | 101792334 A | 8/2010 | |
| CN | 101844949 A | 9/2010 | |
| CN | 101993270 A | 3/2011 | |
| CN | 101993317 A | 3/2011 | |
| CN | 102001899 A | 4/2011 | |
| CN | 102249766 | 11/2011 | |
| CN | 102304003 A | 1/2012 | |
| CN | 102464500 | 5/2012 | |
| CN | 102464508 | 5/2012 | |
| CN | 103011958 A | 4/2013 | |
| CN | 103613464 A | 3/2014 | |
| CN | 103688788 A | 4/2014 | |
| CN | 103930387 A | 7/2014 | |
| CN | 104016379 A | 9/2014 | |
| CN | 104211545 | 12/2014 | |
| CN | 104341228 | 2/2015 | |
| CN | 104355778 A | 2/2015 | |
| CN | 104609967 A | 5/2015 | |
| CN | 105130645 A | 12/2015 | |
| CN | 105263614 A | 1/2016 | |
| CN | 105347983 | 2/2016 | |
| CN | 106082279 A | 11/2016 | |
| CN | 104355778 B | 2/2017 | |
| CN | 106495811 A | 3/2017 | |
| CN | 106536033 A | 3/2017 | |
| CN | 106536035 A | 3/2017 | |
| CN | 106699485 | 5/2017 | |
| CN | 107418586 A | 12/2017 | |
| CN | 107922286 A | 4/2018 | |
| CN | 108367996 A | 8/2018 | |
| CO | 7200058 | 2/2015 | |
| DE | 2408410 A1 | 8/1974 | |
| DE | 102007049182 B3 | 5/2009 | |
| DE | 102009041456 | 3/2011 | |
| DE | 102013004597 A1 | 9/2014 | |
| EP | 0488199 | 6/1992 | |
| EP | 0488199 B1 | 1/1995 | |
| EP | 0835161 | 4/1998 | |
| EP | 0918045 A1 | 5/1999 | |
| EP | 2840074 | 2/2015 | |
| FR | 2583412 A1 | 12/1986 | |
| GB | 935007 A | 8/1963 | |
| GB | 1378938 | 12/1974 | |
| GB | 2032903 A | 5/1980 | |
| GB | 2514233 A | 11/2014 | |
| GB | 2514776 A | 12/2014 | |
| GB | 2522490 A | 7/2015 | |
| GB | 2522492 A | 7/2015 | |
| GB | 2522490 B | 12/2015 | |
| GB | 2577865 A | 4/2020 | |
| JP | H0255397 | 2/1990 | |
| JP | 2003112017 | 4/2003 | |
| JP | 2004182549 | 7/2004 | |
| JP | 3816870 | 8/2006 | |
| KR | 101335445 B1 | 12/2013 | |
| RU | 2662201 | 7/2018 | |
| SU | 695018 A1 | 6/1982 | |
| SU | 990756 A1 | 1/1983 | |
| SU | 1310337 A1 | 5/1987 | |
| SU | 1430388 A1 * | 10/1988 | C05D 1/02 |
| SU | 1574542 A1 | 6/1990 | |
| WO | 9629287 A1 | 9/1996 | |
| WO | 9730782 | 8/1997 | |
| WO | 0121556 A1 | 3/2001 | |
| WO | 02066402 A1 | 8/2002 | |
| WO | 2006096825 | 9/2006 | |
| WO | 2007071175 | 6/2007 | |
| WO | 2007073207 A1 | 6/2007 | |
| WO | 2009086587 A1 | 7/2009 | |
| WO | 2011053794 A2 | 5/2011 | |
| WO | 2012109723 A1 | 8/2012 | |
| WO | 2012115496 A1 | 8/2012 | |

(56) References Cited

FOREIGN PATENT DOCUMENTS

| WO | 2013055219 | A1 | 4/2013 |
|---|---|---|---|
| WO | 2014026048 | A2 | 2/2014 |
| WO | 2014181149 | A2 | 11/2014 |
| WO | 2015185907 | A1 | 12/2015 |
| WO | 2015185909 | A1 | 12/2015 |
| WO | 2016051130 | A1 | 4/2016 |
| WO | 2016178211 | | 11/2016 |
| WO | 2018073815 | | 4/2018 |
| WO | 2018109773 | | 6/2018 |
| WO | 2018146684 | | 8/2018 |
| WO | 2018154338 | | 8/2018 |
| WO | 2018229757 | A1 | 12/2018 |

OTHER PUBLICATIONS

Albadarin, Ahmad B. et al., "Granulated polyhalite fertilizer caking propensity", Powder Technology, vol. 308, (Dec. 8, 2016), pp. 193-199, URL: https://doi.org/10.1016/j.powtec.2016.12.004, XP029890407.
ARIPO Search Report for App. No. AP/P/2019/011816, dated May 25, 2021, 4 pages.
Bichara et al, FR 2583412, English Translation (Year: 1986) 3 pages.
Brazilian Office Action (with English translation) for App. No. BR112019008082-1, dated Jul. 12, 2021, 8 pages.
Brazilian Office Action for App. No. BR112018007847-6, dated Apr. 22, 2021, 4 pages.
Bryan D. Coday et al., "The sweet spot of forward osmosis: Treatment of produced water, drilling wastewater, and other complex and difficult liquid streams", Desalination 333 (2014) 23-35.
Canadian Office Action dated Jul. 12, 2018 for corresponding CA Patent App. No. 2,890,360, 5 pages.
Chile Office Action (with English translation) for App. No. CL02247-2019, dated Jan. 7, 2021, 16 pages.
Chinese Office Action (with English translation) for App. No. CN2017800029016, dated Mar. 16, 2021, 28 pages.
Chinese Office Action (with English translation) for App. No. CN201780065167.8, dated May 28, 2021, 15 pages.
Chinese Office Action (with English translation) for App. No. CN201880047533.1, dated Aug. 24, 2021, 10 pages.
Chinese Office Action (with English translation) in App. No. CN201780084381.8, dated Jul. 16, 2021, 11 pages.
Colombian Office Action for App. No. NC2019/0009684, dated Jun. 24, 2021, 6 pages.
Colombian Search Report for App. No. NC2019/0015080, dated Jun. 24, 2021, 7 pages.
Corrected Notice of Allowability dated Dec. 21, 2020 for U.S. Appl. No. 16/481,183 (pp. 1-2).
Corrected Notice of Allowability dated Feb. 19, 2021 for U.S. Appl. No. 16/343,900 (pp. 1-2).
Corrected Notice of Allowability dated Oct. 8, 2021 for U.S. Appl. No. 16/468,380 (pp. 1-4).
Database WPI, Week 198346 Thomson Scientific, London, GB; AN 1983-819450, XP002801001, & SU 990 756 A (Kaluga Khlorvinil) Jan. 23, 1983 (Jan. 23, 1983) (1 page).
English version of Chinese Office Action for App. No. CN2017800029016, dated Nov. 16, 2021, 12 pages.
English version of Chinese Office Action for App. No. CN2018800081429, dated May 24, 2021, 4 pages.
Extended European Search Report for App. No. EP18751114.2, dated Nov. 20, 2020, 8 pages.
Extended European Search Report for App. No. EP18817032.8, dated Feb. 25, 2021, 7 pages.
Extended European Search Report for Application No. 16789406.2 dated Dec. 14, 2018, 8 pages.
Gao et al, CN 106082279, English Translation (Year: 2016) 6 pages.
Indian Examination Report dated Jun. 28, 2018 for IN Application No. 829DELNP2015, 6 pages.
Indian Office Action for App. No. IN201927054628, dated Jun. 11, 2021, 6 pages.
Indonesian Office Action (with English translation) for App. No. P00202000013, dated Jul. 23, 2021, 7 pages.
Indonesian Patent Office Action for App. No. PID201906345, dated Apr. 1, 2021, 4 pages.
International Search Report and Written Opinion mailed Dec. 19, 2013 for corresponding International Patent Application No. PCT/US2013/049166. 7 pages.
Mu Changrong, et al., "Production and Application Technology of Compound Fertilizer", Chengdu University of Science and Technology Press, Dec. 1994, 1st edition, p. 131, 4 pages.
Notice of Allowance dated Jan. 26, 2021 for U.S. Appl. No. 16/343,900 (pp. 1-5).
Notice of Allowance dated Oct. 1, 2021 for U.S. Appl. No. 16/468,380 (pp. 1-5).
Notice of Allowance dated Sep. 16, 2020 for U.S. Appl. No. 16/481,183 (pp. 1-9).
Office Action data May 19, 2020 for U.S. Appl. No. 16/343,900 (pp. 1-6).
Office Action dated Apr. 7, 2020, for U.S. Appl. No. 16/343,900 (pp. 1-7).
Office Action dated Aug. 25, 2020 for U.S. Appl. No. 16/343,900 (pp. 1-5).
Office Action dated Aug. 4, 2020 for U.S. Appl. No. 15/570,753 (pp. 1-13).
Office Action dated Feb. 11, 2020, for U.S. Appl. No. 15/570,753 (pp. 1-9).
Office Action dated Jan. 12, 2021 for U.S. Appl. No. 16/343,900 (pp. 1-4).
Office Action dated Jul. 3, 2018 for U.S. Appl. No. 15/559,424 (pp. 1-9).
Office Action dated Jun. 16, 2021 for U.S. Appl. No. 16/468,380 (pp. 1-11).
Office Action dated May 22, 2020 for U.S. Appl. No. 15/570,753 (pp. 1-11).
Office Action dated Sep. 25, 2020 for U.S. Appl. No. 16/343,900 (pp. 1-4).
Omeman, Z. et al, "Geopolymer cement in concrete: novel sustainable", Cemento-Hormigon, 78(906), 4-19 STNDatabase accession No. 2008:130694 XP002777656, 2 pages.
Powder handling & processing, Compaction In Fertilizer Production, "Compaction-Granulation of Fertilizer. An Economical Process for a la carte Formulations", vol. 11(3), Jul./Sep. 1999 (Sep. 30, 1999) 4 pages.
R. L. Earle., "Chapter 8: Evaporation. Multiple Effect Evaporation", Unit Operations in Food Processing, (Dec. 31, 1983), URL: http://www.nzifst.org.nz/unitoperations/evaporation2.htm, XP055282974, 18 pages.
RU Office Action dated Jul. 31, 2019 for RU Application No. 2017141009 (4 pages).
RU Office Action dated May 15, 2017 for RU Application No. 2015103308 (9 pages).
RU Search Report dated May 5, 2017 for RU Application No. 2015103308 (2 pages).
Russian Search Report for Application No. RU2017141009, dated Jul. 10, 2019, 2 pages.
Satisha, G.C, "Bioefficacy of Polyhalite Application on Yield and Quality of Cabbage and Cauliflower // Polyhalite Application Improves Tea (*Camillia sinensis*) Yield and Quality in Vietnam", Compendium of Polysulphate scientific research, P.O.Box 75, Beer-Sheva 8410001, Israel, (Dec. 31, 2016), pp. 43-61, URL: http://www.polysulphate.com/uploads/Documents/polysulphate-scientific-compendium.pdf, XP009517838.
Study on the phase change of gypsum in fertilizer salt and the granulation mechanism of compound fertilizer, Huanghua, Master's degree thesis of Shanxi Normal University Aug. 31, 2014, pp. 37-41.
Unit Operations in Food Processing—R. L Earle, 1983, NZIFST, http://www.nzifst.org.nz/unitoperations/evaporation2.htm. 7 pages.
Written Opinion of the International Search Authority for parent PCT application PCT/IL2016/050436, 6 pages.

(56) References Cited

OTHER PUBLICATIONS

Written Opinion of the International Search Authority for parent PCT application PCT/IL2017/050358 mailed Jun. 25, 2017, 6 pages.

Written Opinion of the International Search Authority for parent PCT application PCT/IL2014/050278, mailed Sep. 14, 2015. 6 pages.

Wu Yuguang et al., "Guide to the Use of Chemical Fertilizers", China Agriculture Press, Sep. 2000, 1st edition, p. 112, 4 pages.

Xu Jinga, et al., "Series of Books On New Production Technology For Compound Fertilizer and Functional Fertilizer And Application Technology Thereof, Production Process Technology," Chemical Industry Press, first edition, Sep. 2000, p. 84, 5 pages.

ARIPO Search Report for App. No. AP/P/2019/011816, dated Nov. 14, 2021, 1 page.

Chinese Office Action (with English translation) for App. No. CN201780065167.8, dated Jan. 6, 2022, 8 pages.

Chinese Office Action (with English translation) for App. No. CN201880089257.5, dated Dec. 24, 2021, 16 pages.

Chinese Office Action (with English translation) for App. No. CN201980021914.7, dated Jan. 6, 2022, 10 pages.

European Patent Office Communication pursuant to Article 94(3) EPC for App. No. EP17801109.4, dated Dec. 1, 2021, 2 pages.

Examination Report for App. No. GB1909749.2, dated Jan. 10, 2022, 2 pages.

Office Action (Notice of Allowance and Fees Due (PTOL-85)) dated Jan. 24, 2022 for U.S. Appl. No. 16/468,380 (pp. 1-5).

Office Action (Notice of Allowance and Fees Due (PTOL-85)) dated Feb. 9, 2022 for U.S. Appl. No. 16/468,380 (pp. 1-2).

AU Examination Report dated Dec. 15, 2021 for Application No. 2017377149, 4 pages.

Extended European Search Report for App. No. EP18834743.9, dated Mar. 18, 2021, 8 pages.

Office Action (Non-Final Rejection) dated Apr. 8, 2022 for U.S. Appl. No. 16/630,436 (pp. 1-9).

European Patent Office Communication pursuant to Article 94(3) EPC issued in App. No. EP16789406.2, mailing date Apr. 11, 2022, 6 pages.

Chinese Office Action (including English translation) issued in App. No. CN201880089257.5, dated Mar. 31, 2022, 13 pages.

International Potash Institute, 1st IPI Symposium on Polyhalite, Oct. 31, 2017 (Year: 2016).

Sirius Minerals PLC, Polyhalite Product "POLY4" Characterisation Tests (Year: 2013).

Mississippi State University, Soil pH and Fertilizer, Information Sheer 372 (Year: 2015).

John Fulton Physical Properties of Granular Fertilizer and Impact on Spreading, Jul. 28, 2016 (Year: 2016).

Office Action dated May 16, 2022 for U.S. Appl. No. 17/054,230 (pp. 1-15).

Chinese Office Action (with English translation) issued in App. No. CN201980077181.9, dated Apr. 15, 2022, 14 pages.

Brazilian Office Action (including English translation) issued in App. No. BR1120190157492, dated Apr. 27, 2022, 8 pages.

"Potash", Chemical Economics Handbook (CEH) | IHS Markit, (Jul. 2018), URL: https://ihsmarkit.com/products/potash-chemical-economics-handbook.html, XP055809577.

"Potash", Wikipedia, (May 1, 2021), URL: https://en.wikipedia.org/w/index.php?title=Potash&oldid=1020843242, XP055809575.

Yara Fertilizer Industry Handbook, (Oct. 00, 2018), pp. 1-97, URL: https://www.yara.com/siteassets/investors/057-reports-and-presentations/other/2018/fertilizer-industry-handbook-2018-with-notes.pdf/, XP055809580.

FAO of the United Nations, "World Fertilizer trends and outlook to 2020", Summary report, (2017), XP055809583.

"Potash", URL: https://www.cargohandbook.com/Potash.

Extended European Search Report issued in App. No. EP19886999, dated Jul. 22, 2022, 7 pages.

Israel Office Action (including English translation) issued in App. No. IL271481, dated Nov. 21, 2022, 4 pages.

Chinese Office Action (with English translation) issued in App. No. CN201980077181.9, dated Nov. 11, 2022, 8 pages.

Chinese Office Action (including English translation) issued in App. No. CN201880089257.5, dated Nov. 14, 2022, 12 pages.

Eurasian Office Action (including English translation) issued in App. No. EA202091794, dated Dec. 23, 2022, 7 pages.

Hu Yinping, "Power Station Boiler Handbook", Beijing: China Electric Power Press, dated Apr. 30, 2005.

Canadian Office Action issued in App. No. CA3069913, dated May 23, 2023, 3 pages.

Everris. "ICL Potashplus 0-0-37" <https://www.everris.com/products/specialty_agriculture/icl-potashplus-icl-potashplus/>(obtained 2023) (Year: 2023).

Office Action (Final Rejection) dated Jul. 27, 2023 for U.S. Appl. No. 16/630,436 (pp. 1-7).

Office Action (Final Rejection) dated Jul. 19, 2022 for U.S. Appl. No. 16/630,436 (pp. 1-12).

Power Station Boiler Handbook, 4 pages. 胡荫平,《电站锅炉手册》, 北京：中国电力出版社, (Apr. 30, 2005).

European Patent Office Communication pursuant to Article 94(3) EPC issued in App. No. EP18834743, dated Sep. 16, 2022, 4 pages.

European Patent Office Communication pursuant to Rules 70(2) and 70a(2) EPC issued in App. No. EP19886999, dated Aug. 9, 2022, 1 page.

Brazilian Office Action (including English translation) issued in App. No. BR112020015159, dated Sep. 9, 2022, 8 pages.

TESS Trademark Electronic Search System, "ICL PotashpluS" filing date Aug. 29, 2018 (Year: 2018).

ICL "Safety data sheet: PotashpluS" Printing Date Jul. 24, 2016 v.1 (Year: 2016).

ICL "Product Specification ICL Potashplus 37%" Ref: QD0041 Feb. 15, 2017 (Year: 2017).

Office Action (Non-Final Rejection) dated Sep. 20, 2022 for U.S. Appl. No. 17/054,230 (pp. 1-6).

Brazilian Office Action issued in App. No. BR1120190157492, dated Sep. 17, 2022, 4 pages.

Indian Office Action issued in App. No. IN202127025255, dated Sep. 15, 2022, 5 pages.

Office Action (Non-Final Rejection) dated Jan. 20, 2023 for U.S. Appl. No. 16/630,436 (pp. 1-6).

Israel Office Action (including English translation) issued in App. No. IL276686, dated Feb. 23, 2023, 4 pages.

European Patent Office Communication pursuant to Article 94(3) EPC issued in App. No. EP18907827, dated Feb. 13, 2023, 5 pages.

European Patent Office Communication pursuant to Article 94(3) EPC issued in App. No. EP18834743, dated Mar. 31, 2023, 6 pages.

Brazilian Office Action (including English translation) issued in App. No. BR112020015159, dated Apr. 17, 2023, 8 pages.

Skydanenko, Maksym, et al. "Reduction of dust emission by monodisperse system technology for ammonium nitrate manufacturing." Processes 5.3 (2017): 37. (Year: 2017).

Beisembaeva, L., et al. "Texhonorna docoporanca B ." Chemical Bulletin of Kazakh National University 64.4 (2011): 42-45. (Year: 2011).

Office Action (Non-Final Rejection) dated Oct. 18, 2023 for U.S. App. No. 16/630,436 (pp. 1-9).

* cited by examiner

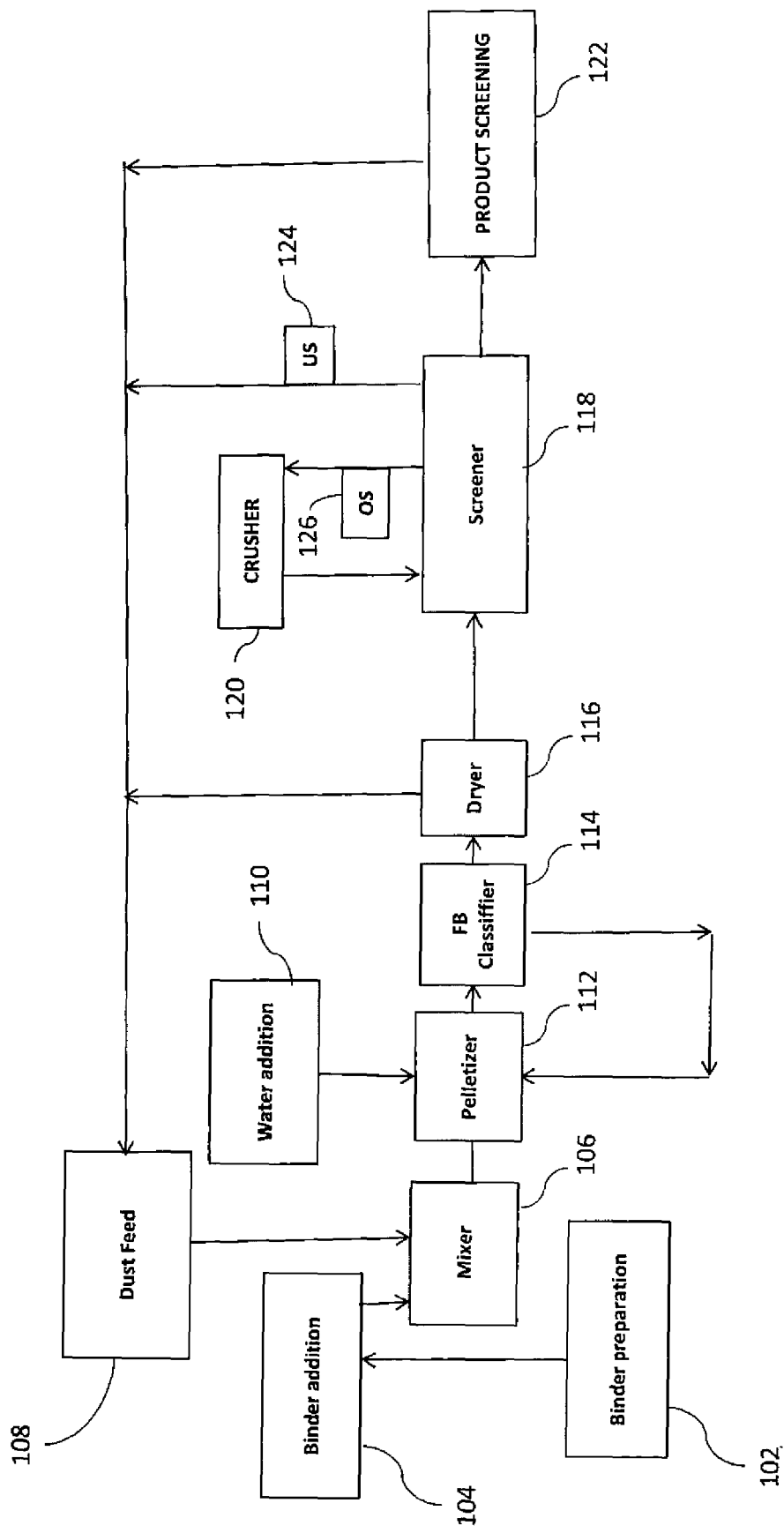

POTASH DUST GRANULATION PROCESS

FIELDS OF INVENTION

The present invention relates to the field of fertilizers, specifically to the production of Potash granules from Potash dust.

BACKGROUND OF THE INVENTION

To grow properly, plants need nutrients (nitrogen, potassium, calcium, zinc, magnesium, iron, manganese, etc.) which normally can be found in the soil. When some elements lack from the ground fertilizers are added to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth
Phosphorus (P): Development of roots, flowers, seeds, fruit;
Potassium (K): Strong stem growth, movement of water in plants, promotion of flowering and fruiting;
Three secondary macronutrients: calcium (Ca), magnesium (Mg), and sulphur (S);
Micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

During manufacturing of various types of dry fertilizers dust is usually formed.

Often compaction may be used to utilize the dust formed in such process, however, compaction is a cumbersome operation usually requiring the use of high intensity compactors.

SUMMARY OF THE INVENTION

According to some demonstrative embodiments, there is provided herein a granule including potash dust comprising a binder selected from the group including Fly ash, Sodium Silicate, Potassium Silicate, lime, Glass-Potassium metha silicate, lignosulfonates, Bentonite metakaolin, oxides such us Calcium oxide, NaOH, starches or a combination thereof.

According to some embodiments, the Potash dust may comprise particles in any size under 0.5 mm, preferably between 0.001-0.5 mm.

According to some demonstrative embodiments, some silicate containing binders are preferable as they include elements which might be beneficial for the plane, beyond their binder properties, such binder may include for example, Fly Ash, Glass-Potassium metha silicate, Bentonite and the like.

According to some embodiments, the Fly Ash may be in a concentration of between 0.5-8% w/w.

According to some embodiments, Glass-Potassium metha silicate may be in a concentration of between 0.5-5% w/w.

According to some embodiments, the Bentonite may be in a concentration of between 0.5-5% w/w.

According to some embodiments, the starch may be in a concentration of between 0.5-5% w/w.

According to some embodiments, the granule may further include additives selected from the group including minerals, binders, micro-elements, macro-elements, water or a combination thereof.

According to some embodiments, the minerals may include polyhalite in a concentration between 0.5-6% w/w.

According to some embodiments, there is provided herein a process of granulation of potash dust comprising: preparation of a binder; transferring the binder to a mixer and homogeneously mixing said binder with a dust feed to yield initial granules; transferring the initial granules to a pelletizer to yield pellets ranging in size from 0.5 mm to 8 mm; transferring the pellets to a Fluidized Bed (FB) Classifier to yield classified pellets; drying the classified pellets in a dryer and transferring to a screener to yield particles in 3 different size ranges:
1. oversized particles having a size diameter of more than 6 mm
2. undersized particles having a size diameter between of below 1 mm
3. desired sized particles having a size diameter of between 1 to 6 mm;

introducing the undersized particles back to the dust feed; and crushing the oversized particles to provide crushed particles wherein the crushed particles are then screened through the screener.

According to some embodiments, the preparation of the binder may include the following steps: binder heating, mixing, grinding, activation, dissolution and curing.

According to some embodiments, the desired size particles may have a size diameter of between 2-4 mm, for example, which is beneficial for both the release rate of the fertilizer and for transportation purposes.

According to some embodiments, there is provided herein a method for granulating fertilizer dust, e.g., potash dust, comprising premixing the dust in High share mixer, Drum, pelletizer and/or a combination thereof to produce a Potash blend.

According to some embodiments, the method may include adding additives, for example, minerals, organic and inorganic dry and wet binders, diluted binders, micro-elements, macro-elements, cold, hot water, steam or a combination thereof.

According to some embodiments, the method may include the adding the blend to a granulator in order to yield granules from Potash dust.

According to some embodiments, the granules formed in the granulator may be dried, for example, in a drum drier or fluid bed dryer or combination of them and optionally sieved after or before drying to provide desired size granules of Potash.

DETAILS DESCRIPTION OF THE INVENTION

According to some demonstrative embodiments, there is provided herein a granule of Potash dust comprising a binder or combination of thereof.

According to some demonstrative embodiments, the binder may be selected from the group including Fly ash, Sodium Silicate, Potassium Silicate, Oxides such as Calcium Oxide, metakaolin, Zinc Oxide and/or Iron Oxide and starches.

According to some demonstrative embodiments, the binder may preferably be Fly ash, potassium silicate and calcium oxide. According to some embodiments, Fly ash may be preferable as it acts as a geopolymer which forms very strong bridges of binder between the dusty material particles.

According to some embodiments, the Potash dust may comprise particles in any size under 0.5 mm, preferably between 0.001-0.5 mm.

According to some embodiments, in the industrial process of handling Potash it may be extremely difficult and/or cumbersome to utilize Potash particles having a size of under 0.5 mm (also referred to herein as "Potash Dust"). Such particles are not easily adhered and usually are discarded during the process of handling Potash.

According to some embodiments, Potash dust particles are characterized by having a smooth surface and a rather cubical shape. During a granulation process, there are often big spaces between the Potash dust particles, which makes adherence very difficult. The complicated structure of the potash dust particles allows for just a few contact points between the particles, and consequently the granulated material provides for particles having a very weak adherence.

According to some embodiments, there is provided herein a method for granulating Potash dust, comprising premixing the dust in High share mixer Drum, pelletizer and/or a combination thereof to produce a Potash blend.

According to some embodiments, the method may include adding additives, for example, organic and inorganic dry and wet binders, micro-elements, macro-elements, cold, hot water, steam or a combination thereof.

According to some embodiments, the method may include adding the blend to a granulator in order to yield granules of Potash dust.

According to some embodiments, the granulator may include any suitable granulator including, for example, High share granulator, pelletizer, drum granulator and the like.

According to some embodiments, the granules formed in the granulator may be dried, for example, in a drum drier or fluid bed dryer and optionally sieved to provide desired size granules of Potash.

According to some embodiments of the present invention, the method described herein may include an efficient process to utilize the maximum amount of Potash dust, and diminish product waste.

According to some demonstrative embodiments, the Potash dust granule of the present invention may comprise one or more binders and/or additives, for example, to improve the adherence, rheology and/or strength of the granule wherein the binders and/or additive may be selected from the group including bentonite, e.g., in a concentration between 0.5-5% w/w; Starch e.g., in a concentration between 0.5-5% w/w; Oat e.g., in a concentration between 0.5-5% w/w; Fly Ash, e.g., in a concentration between 0.5-5% w/w.

According to some demonstrative embodiments, the granule of the present invention preferably comprises Fly Ash, Potassium silicate, calcium hydroxide or a combination thereof as a binder.

According to some embodiments, the granule may include a combination of binders and/or additives, including for example, a combination of Fly Ash and NaOH e.g., in a concentration between 0.5-5% w/w; Fly Ash and 0-2% w/w of Ca $(OH)_2$; Fly Ash and 0-4% w/w CaO or 0-6% w/w MgO; Fly Ash and 0-2% w/w ZnO; Fly Ash and 0-2% w/w FeO; Fly Ash and 0-6% w/w SSP (single super phosphate), TSP (triple super phosphate), optionally with Water glass; Fly Ash and 0-6% w/w Polyhalite; Fly Ash and 0-5% Wax, e.g, Slack wax; Fly Ash and 0-10% w/w PEG, Potassium silicate 2.5% Calcium oxide 2%.

| Physical & Chemical properties | |
|---|---|
| pH | Neutral |
| $H_2O$ | <0.1% |
| Abrasion (−12 mesh) | 7-20% |
| Abrasion (−32 mesh) | 2-15% |
| Single strength | 3-1.5 kg/granule |
| Single strength after 77% humidity | 0.5-3 kg/granule |
| Dust after abrasion | 0.5-2.% |
| Environmental dust | <0.05 |

According to these embodiments the granule size distribution may be between 0.5-8 mm, preferably between 2-4 mm.

According to these embodiments, any oversized particles may undergo a process of crushing, and the crushed particles may be recycled back to the granulator together with any undersized particles, for example, as explained in detail with regard to FIG. 1.

According to some embodiments, the granules of the present invention may possess preferred characteristics for example, when compared to granules produced via a process of compaction. According to some embodiments, the preferred characteristics may include, for example, better rheology, diminished formation of dust during conveyance, diminished bulking and/or aggregating effect.

Reference is made to FIG. 1 which illustrates a process of granulation of Potash dust ("the process").

As shown in FIG. 1, the process may include the preparation of a binder 102, which may include the following steps: binder heating, mixing, grinding, activation, dissolution and curing and or any other suitable action that may prepare a binder to be mixed with potash dust.

The prepared binder may optionally be further mixed with water at the binder addition step 104. The binder may then be transferred to a mixer 106 and homogeneously mixed with a dust feed 108 to yield initial granules (also referred to herein as "blend").

According to some embodiments, mixer 106 may include any suitable mixer that may enable the homogenous mixing of the dust feed with a binder and/or water, including, for example, High share mixer, Drum, a Ploughshare® Mixer, Paddle mixer, Pin mixer and the like.

According to some embodiments, the initial granules may be transferred to a pelletizer 112, wherein additional water may be added if required as per step 110. According to some embodiments, additional additives may be added to pelletizer 112, including for example, additional binders, micro or macro elements or combinations thereof. The yields from pelletizer 112 may be pellets ranging in size from 0.5 mm to 8 mm.

The pellets may then be transferred to a Fluidized Bed (FB) Classifier 114 to optionally separate oversized particles (also referred to herein as "OS"), and any undersized particles (Also referred to herein as "US") may be recycled to the mixer or the pelletizer.

According to some embodiments, the classified pellets may then be dried in a dryer 116 and transferred to screener 118.

According to some embodiments, any dust that is formed during the drying process of dryer 116 may be transferred back to dust feed 108.

According to some demonstrative embodiments, from screener 118 there may be yielded particles in 3 different size ranges:
1. Oversized particles 126 (also referred to herein as "OS") having a size diameter of more than 6 mm.
2. Undersized particles 124 (Also referred to herein as "US") having a size diameter between of below 1 mm.
3. Desired sized particles having a size diameter of between 1 to 6 mm, preferably between 2-4 mm.

According to some embodiments undersized particles 124 and/or any dust that may be formed while passing through screener 118 can be introduced back to the process, e.g., to dust feed 108.

Oversized particles 126 may go at least one crushing procedure to be crushed to a desired size via crusher 120 and the resulting crushed particles are then screened through once again via screener 118.

According to some embodiments, desired sized particles undergo product screening in step 122.

According to some embodiments any dust that may be formed during product screening 122 can be introduced back to the process, e.g., to dust feed 108.

Potash granules can provide superior characterization as fertilizers like adding microelements, coated Potash and beneficial in using Potash dust.

Example—1

2000 gr of KCl dust mixed with 1.2% ZnO, 14% of water added by Eirich mixer for 2.5 minutes at 4000 rpm. 4% Fly Ash, 2% NaOH added and mixed at 1000 rpm for 1 minute and 5 minutes at 500 rpm. 25 gr more of water added during granulation process. The granules dried at 180° C. for 20 minutes The yield was 81%. The strength of the granules was 3.1 Kg per granule and 2.6 Kg per granule after 24 Hrs. at 79% humidity.

Example—2

As example 1 with 1.2% of $Ca(OH)_2$.
The yield was 73%. The strength of the granules was 3.1 Kg per granule and 2.6 Kg per granule after 24 Hrs. at 79% humidity.

Example 3

As Example 1 with 1% of $Ca(OH)_2$, and initial mixing at 4 minutes.
The yield was 64%. The strength of the granules was 2.8 Kg per granule and 1.5 Kg per granule after 24 Hrs. at 79% humidity.

Example 4

As Example 3 with premixing of 4 minutes.
The yield was 73%. The strength of the granules was 2.4 Kg per granule and 1.2 Kg per granule after 24 Hrs. at 79%. humidity.

Example 5

15 Kg of Potash dust 5% of Fly Ash and 14% water mixed by Ploughshare at 350 rpm for 35 minutes.
The yield was 35%. The strength of the granules was 2.2 Kg per granule and 1 Kg per granule after 24 Hrs. at 79% humidity.

Example 6

25 Kg of Potash dust 5% of Fly Ash and 14% water mixed by Ploughshare at 350 rpm for 15 minutes.
The yield was 26%. The strength of the granules was 2.5 Kg per granule and 0.5 Kg per granule after 24 Hrs. at 79% humidity.

Example 7

As Example 5 with 8% solid Phosphogypsum. The strength of the granules was 2.4 Kg per granule and 1 Kg per granule after 24 hrs humidity.

Example 8

As Example 7 with 8% slurry Phosphogypsum The strength of the granules was 1.7 Kg per granule and 1.5 Kg per granule after 24 Hrs humidity.

Example 9

As Example 5 with KCL and 4% of Fly Ash. The strength of the granules was 2.9 Kg per granule and 1.4 Kg per granule after 24 Hrs humidity.

Example 10

AS Example 1 with 3% Water Glass 3% Fly Ash. The strength of the granules was 2.2 Kg per granule and 2.6 Kg per granule after 24 Hrs humidity.

Example 11

AS Example 10 with 3% Water Glass 3% Fly Ash 0.1% FeO and 5% SSP as coating material. The strength of the granules was 2.0 Kg per granule and 2.1 Kg per granule after 24 Hrs humidity.

Example 12

30 Kg of Potash dust are crushed to dust, 75%<110 μm, 14%<44 μm, and transferred to rotating inclined mixer machine with eccentric mixing rotating at high speed.

The Potash is mixed at elevated temperature, for example, around 80 degrees Celsius.

Dry (dry mixing step) and liquid (moistening step) additives and binders are added and the mixture mixed additional time after each step.

The mixture is then transferred to rotating and inclined disk pelletizer for granulation (granulation step).

The granulated product is transferred to wet screening to result in granules sized between 2-4 mm. The undersize return to the mixer, and the oversize to crusher and back to the process. The granules dried in two steps at 70 degrees and then at 120 degrees. The product between 2-4 mm screened and can be coated by hydrophobic agent.

Example 13

30 Kg of Potash dust, 75%<110 μm, 14%<44 μm, mixed at rotor speed 5 m/s and vessel speed 1.4 m/s for 18 minutes at 80 degrees.

In the dry mixing step dry additives and binder added: 750 Gr of Calcium Oxide and 27.5 gr of Iron Oxide and mix for additional 1 minute at rotor speed of 9 m/s.

In the Moistening step, liquid additive and binder added: 7.5 Kg of water at 60 degrees and 0.9 Kg of Potassium Silicate at 86 degrees added and the mixture mixed for 0.5 minute.

The mixture is then transferred to the pelletizer and granulated for 2 minutes at rotor speed of 27 m/s and 86 degrees. The granules screened to get 2-4 mm granules.

Undersized material is returned to the mixer and the oversized material is transferred to the crusher, The granules between 2-4 mm dried at two stages: 70 degrees and 110 degrees.

Example 14

30 Kg of Potash dust, 75%<110 μm, 14%<44 μm, mixed at speed 5 m/s and vessel speed 1.4 m/s for 18 minutes at 80 degrees. Dry additives and binders added: 450 Gr of Calcium Oxide, 300 Gr of Fly ash and 27.5 Gr of Iron Oxide added and mix for additional 1 minute at rotor speed of 9 m/s.

Liquid additives are then added at the moistening step: 8 Kg of water at 60 degrees and 0.9 Kg of Potassium Silicate at 86 mixed for 0.5 minute and granulated for 1.5 minutes at rotor speed of 27 M/S at 80 degrees.

The granules are then screened to get 2-4 mm granules. Any undersize material is returned to the mixer and any oversize material is transferred to the crusher.

The resulting granules between 2-4 mm are dried at two stages: 70 degrees and 110 degrees Celsius.

Example 15

As in example 13

50 Kg of potash dust mixed for 18 minutes at temperature in mixing step 85 degrees rotor speed 5 m\s vessel speed 1.4 m/s. Dry mixing: 1250 Gr of Calcium Oxide, 314 Gr Zinc Oxide 1159 Gr Zinc Sulphate Hepta Hydrate and 27.5 Gr Iron Oxide mixed for additional 0.5 minute at rotor speed 9 m/s. In moistening step 8 Kg of water, 2.5 Kg of Potassium Silicate and mixed 0.5 minute, and granulated a 1.5 minutes at rotor speed of 27 m/s.

Example 16

As example 15

Dry additives: 1250 Gr Calcium Oxide, 628 Gr Zinc Oxide, 27.5 Gr iron Oxide. In Moistening step 8 Kg of water, 2.5 Kg of Potassium Silicate and mixed 0.5 minute, and granulated a 1.5 minutes at rotor speed of 27 m/s.

While this invention has been described in terms of some specific examples, many modifications and variations are possible. It is therefore understood that within the scope of the appended claims, the invention may be realized otherwise than as specifically described.

The invention claimed is:

1. A granule consisting of potash dust and a binder, wherein said binder is fly ash in a concentration of between 0.5-8% w/w and said potash dust comprises particles in the size between 0.001-0.5 mm.

2. The granule of claim 1, further comprising additives selected from the group consisting of minerals, binders, micro-elements, macro-elements, water and a combination thereof.

3. The granule of claim 2, wherein said additives comprises polyhalite.

4. A process for the preparation of the granule of claim 1, comprising:
   preparation of fly ash as a binder;
   transferring said binder to a mixer and homogeneously mixing said binder with a potash dust feed, wherein said potash dust feed comprises potash particles in the size between 0.001-0.5 mm, to yield initial granules, and wherein in said initial granules said fly ash binder is in a concentration of between 0.5-8% w/w;
   transferring said initial granules to a pelletizer to yield pellets ranging in size from 0.5 mm to 8 mm;
   transferring said pellets to a fluidized bed classifier to yield classified pellets;
   drying the classified pellets in a dryer and transferring to a screener to yield particles in 3 different size ranges:
   1. oversized particles having a size diameter of more than 6 mm,
   2. undersized particles having a size diameter of below 1 mm,
   3. desired sized particles having a size diameter of between 1 to 6 mm;
   introducing said undersized particles back to said dust feed; and
   crushing said oversized particles to provide crushed particles wherein said crushed particles are then screened through said screener.

5. The process of claim 4, wherein preparation of said binder comprises the following steps: binder heating, mixing, grinding, activation, dissolution and curing.

6. The process of claim 4, wherein said desired size particles having a size diameter of between 2-4 mm.

* * * * *